United States Patent [19]

Grueschow

[11] 4,144,169
[45] Mar. 13, 1979

[54] FILTER UNIT

[75] Inventor: Clifford H. Grueschow, Monroe, Mich.

[73] Assignee: Monroe Auto Equipment Company, Monroe, Mich.

[21] Appl. No.: 803,979

[22] Filed: Jun. 6, 1977

[51] Int. Cl.² .................. B01D 35/00; C10M 7/10
[52] U.S. Cl. .................................... 210/168; 210/199; 210/206; 210/209; 210/501; 252/10
[58] Field of Search ............... 210/117, 130, 131, 136, 210/167, 168, 199, 206, 209, 223, 501, 502, 506, 507; 252/9–11, 56, 59; 23/267, 272

[56] References Cited

U.S. PATENT DOCUMENTS

| | | | |
|---|---|---|---|
| 2,785,805 | 3/1957 | Hough | 210/168 |
| 2,976,999 | 3/1961 | Paton | 210/223 |
| 3,336,223 | 8/1967 | Kneeland | 252/56 R |
| 3,608,724 | 1/1970 | Baldwin | 210/130 |
| 4,075,097 | 2/1978 | Paul | 210/168 |
| 4,075,098 | 2/1978 | Paul et al. | 210/168 |

Primary Examiner—Ferris H. Lander
Attorney, Agent, or Firm—Harness, Dickey & Pierce

[57] ABSTRACT

A filter unit, and method of assembly thereof, of the type to be used with the circulating lubrication system of an internal combustion engine; the unit including an enclosure having sidewall and end sections, a filter element disposed within the enclosure, an additive body within the enclosure between the end section thereof, and the filter element and means, including a helical coil spring, interposed between the filter element and additive body for preventing relative movement thereof within the enclosure.

4 Claims, 3 Drawing Figures

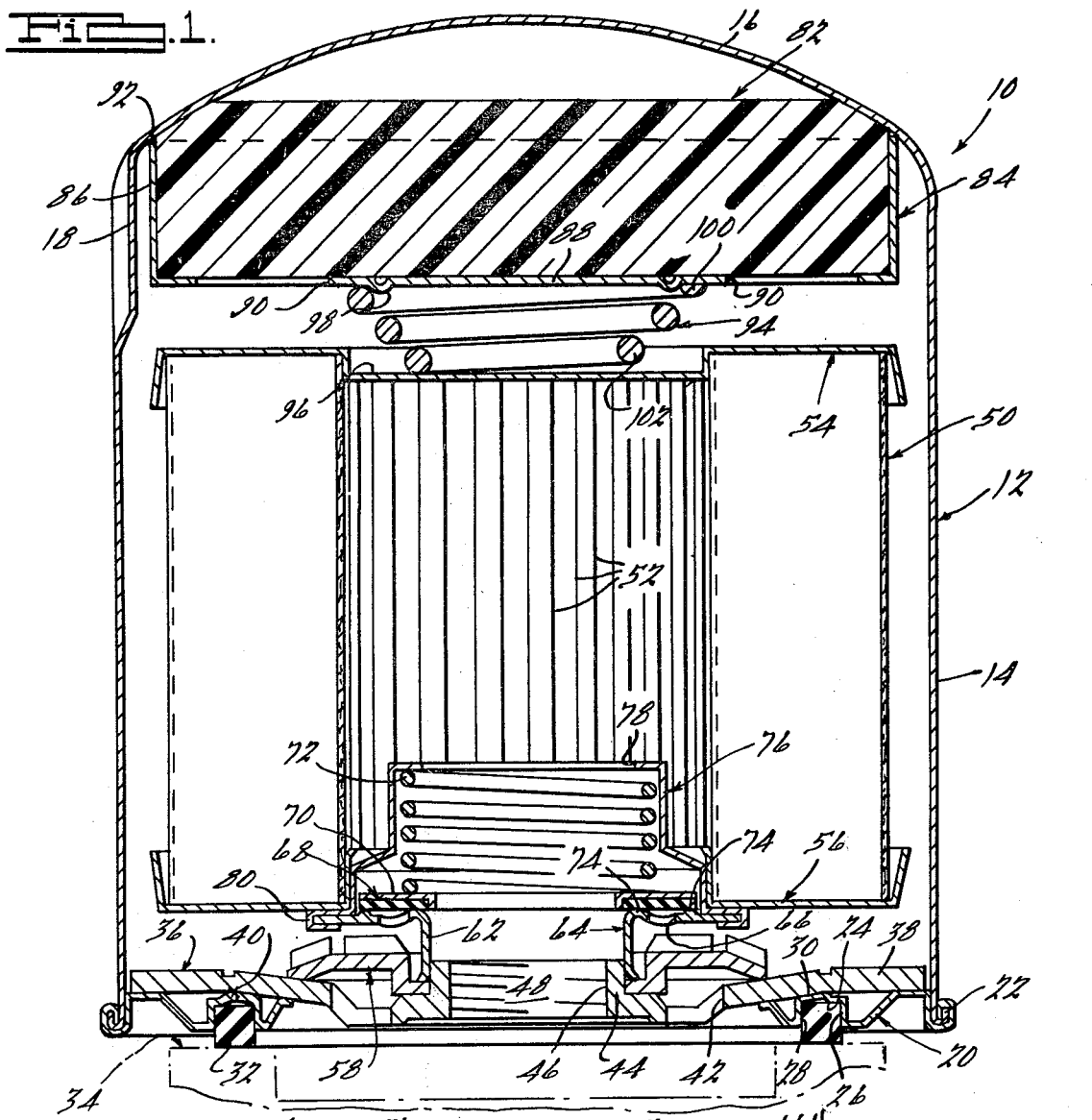
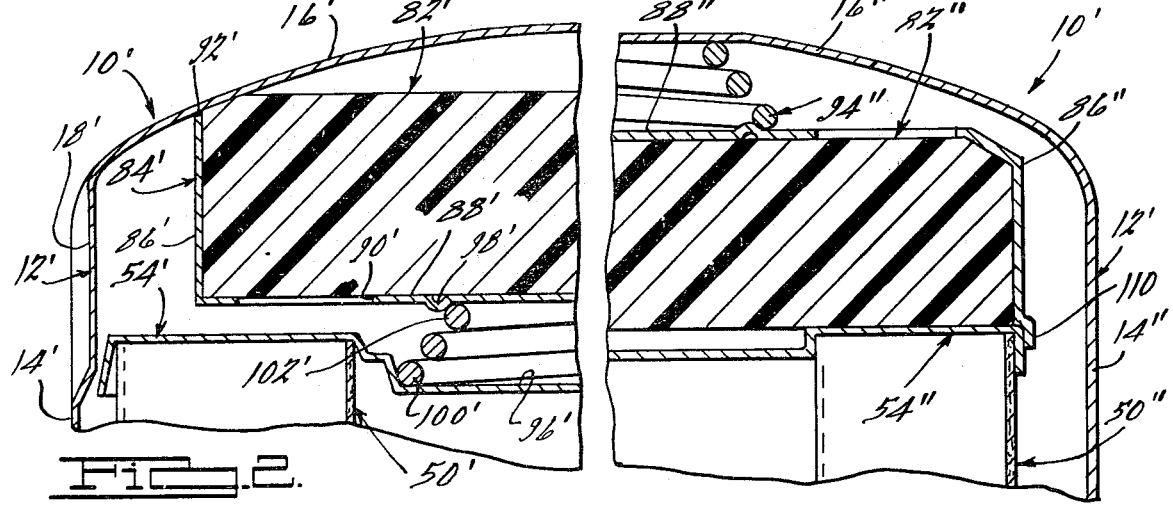

FILTER UNIT

BACKGROUND OF THE INVENTION

The present invention relates generally to fluid filters and, particularly, to a replaceable type oil filter for use in the lubricating systems of internal combustion engines. More specifically, the present invention relates to an oil filter of the above-described type which is provided with an additive body located within the filter enclosure and adapted to dissolve over the service life of the oil so as to replenish additives normally provided in modern engine lubricating oils. Typically, such additives which become depleted over the service life may consist of viscosity index improvers, anti-oxidents and anti-wear - anti-corrosion compounds. A more detailed description of the general type of filter unit to which this specification is directed is disclosed in U.S. pat. application Ser. No. 564,111, filed Apr. 1, 1975.

SUMMARY OF THE INVENTION

This invention relates generally to oil filters of the above-described type, and more particularly, to a new and improved oil filter construction wherein the additive body and oil filter element may be operatively retained within the associated filter housing or enclosure in a manner such that associated hardware or support structure is minimized to the extreme.

It is a more specific object of the present invention to provide a new and improved filter unit of the above described character which facilitates the manufacture of the filter unit in different sizes.

It is yet a further object of the present invention to provide a new and improved filter unit wherein the additive body may be fabricated in a disc-shaped configuration, as opposed to being ring-shaped as was the case in the prior art.

It is yet another object of the present invention to provide a new and improved filter unit of the above-described type wherein the additive body and filter element per se are positively retained in place without having the additive body itself subject to any loading or forces produced by the spring means within the filter unit.

It is a further object to provide a new and improved oil filter and method of assembly thereof wherein the retainer member for the additive body may be varied to control the rate of dissolution of the body.

Other objects and advantages of the present invention will become apparent from the following detailed description, taken in conjunction with the accompanying drawings.

BRIEF DESCRIPTION OF THE DRAWINGS

FIG. 1 is a longitudinal cross-sectional view of one preferred embodiment of the filter unit of the present invention; and FIG. 2 is a fragmentary cross-sectional view of an alternate embodiment of the present invention.

FIG. 3 illustrates another embodiment of the present invention wherein the retainer member and body are disposed in an inverted position with respect to their positions in FIGS. 1 and 2.

DETAILED DESCRIPTION OF THE PREFERRED EMBODIMENTS

Referring now in detail to the drawing and, in particular, to FIG. 1 thereof, a filter unit in accordance with one preferred embodiment of the present invention is generally designated by the numeral 10 and is shown as comprising an exterior housing or enclosure 12 having an annular side wall section 14 and a generally dome-shaped end section 16. The side wall section 14 is formed with a plurality of wrench engaging faces or facets 18 and the lower open end of the enclosure 12 is provided with an annular closure plate 20 which is secured to the annular side wall 14 by means of a roll-type seam or the like 22. The closure plate 20 is formed with an annular recess 24 which is defined by radially spaced wall portions 26, 28 and an axially arranged wall portion 30. Disposed within the annular recess 24 is a fluid seal 32 which is adapted for sealing engagement with a suitable portion of an associated engine block or the like shown in dottled lines in FIG. 1 and designated by the numeral 34.

Secured to the interior side of the closure plate 20 is an annular base plate, generally designated by the numeral 36. The base plate 36 comprises a generally radially extending portion 38 that is secured, as by spot welding or the like, to the closure plate 20, as best seen at 40. The base plate 30 is formed with a plurality of circumferentially spaced, axially extending inlet ports 42 and with a central axially extending flange 44 having an internally threaded inner periphery 46 defining an oil outlet port 48. As will be appreciated by those skilled in the art, the filter unit 10 is intended to be secured to an associated engine block 34 by being threadably received by a suitable standpipe or the like (not shown) which is threaded into the outlet port 48.

Disposed interiorly of enclosure 12 is an annular filter element, generally designated by the numeral 50, which may be fabricated of any suitable filter media and is representatively illustrated herein as being fabricated of pleated filter paper which is folded in a manner so as to provide a plurality of radially extending pleats of flutes, generally designated by the numeral 52. The filter element 50 is disposed between a pair of axially spaced end caps 54 and 56 which close the axially opposite ends of the flutes 52 so as to assure that oil circulating through the unit 10 will pass radially through the filter element 50.

The filter unit 10 is shown as being provided with an anti-drain back valve, generally designated by the numeral 58, which is of a generally disc or ring-shaped configuration and is fabricated of a suitable oil impervious material. The valve 58 is concentrically oriented relative to the oil outlet port 48 and has the inner periphery thereof retained against the inner side of the base plate 36 by means of a generally axially extending section 62 of an annular support flange 64. The flange 64 incluses a radially extending portion defining a plurality of circumferentially spaced, axially extending oil bypass ports 66. The unit 10 is also shown as being provided with a pressure relief valve, generally designated by the numeral 68, which is fabricated of a suitable elastomeric material and is of generally ring-shaped configuration, as seen in FIG. 1. The valve 68 is located adjacent to one side of a support flange or disc 70 that is adapted to be urged under the influence of a coil spring 72 toward a pair of concentric valve seats 74 defined by the support flanges 64, whereby the relief valve 68 will be sealingly engaged with the seat 64 and hence block oil flow through the ports 66. Disposed interiorly from the relief valve 68 is a generally cup-shaped spring retainer 76 that is formed with a central opening 78 and is provided with a generally radially arranged securing flange 80 which extends around the outer periphery of the support flange 64.

As is conventional in the art, at such time as the associated engine is operating, oil will be circulated by the engine oil pump through the lubrication passages of the engine and will be complicated to the inlet ports 42 and then radially outwardly around the outer periphery of the filter element 50. The oil will then pass radially inwardly through the filter element 50 and be filtered thereby, after which time the oil will pass axially through the opening 78 and thereafter through the outlet port 48 back to the engine.

When the engine is not operating, the anti-drainback valve 58 is disposed in the position shown in FIG. 1, with the outer periphery of the valve 58 being movable axially away from the base plate to permit the aforesaid oil circulation at such time as the engine is operating. The pressure relief valve is normally seated against the valve seats 74; however, at such time as the filter element 50 becomes clogged or for some other reason that an excessive pressure differential exists between the inlet ports 42 and the outlet port 48, the valve 68 will move axially against the resistance of the spring 72, whereupon oil entering through the inlet ports 42 will be circulated through the bypass ports 66 and thereafter be returned through the outlet port 48 to the engine, this circumventing circulation through the filter element. It is to be noted that the filter unit 10 of the present invention is shown being provided with the anti-drainback and pressure relief valves merely by way of example and that the principles of the present invention are not necessarily intended to be limited to a filter unit with such valves.

In accordance with the principles of the present invention, disposed between the dome-shaped section 16 of the enclosure 12 and the end cap 54 of the filter element 50 is a generally annular or disc-shaped additive body, generally designated by the numeral 82. The additive body is preferably fabricated of any one of a variety of high molecular weight polymers that are slowly dissolvable in oil and which are suitable to have the desired oil additives compounded therein, whereby when oil contacts the additive polymer composition, the polymer will have a low rate of dissolution in the oil and will thereby be slowly dissolved and/or dispersed into the oil. Preferably, the polymer is a thermosplastic having a low rate of dissolution in the oil and a sufficiently high molecular weight so that the composition is solid at the temperature of the oil contact. By way of example, the polymer body 82 may be fabricated of one of the materials referred to in copending patent application Ser. No. 564,111, filed Apr. 1, 1975, and assigned to the common assignee hereof. Various alternative compositions may be used, however, without departing from the scope or fair meaning of the claims appended hereto.

The additive body 82 is operatively supported within the enclosure 12 by means of a retainer member 84 that comprises an annular side wall portion 86 and generally radially disposed portion 88 which is formed with a plurality of openings or apertures generally designated by the numeral 90. As best seen in FIG. 1, the terminal or marginal edge of the side wall portion 86 bears against the end section 16 of the enclosure 12, as seen at 92. Interposed between the retainer member 84 and the end cap 54 of the filter element 50 is a relatively low rate helical coil spring, generally designated 94. One end of the spring 94 is operatively supported within a central, downwardly projecting portion or depression 96 of the end cap 54, while the opposite (upper) end of the spring 94 bears against the adjacent side of the retainer member 84 and is operatively positioned thereon by means of an annular positioning boss or shoulder 98. The spring 94 is of a generally conical configuration and comprises a major diameter end portion 100 and a minor diameter end portion 102. It is to be noted, however, that the spring 94 could, for certain applications, be of uniform diameter. The diameter of the end portion 100 is slightly greater than the diameter of the positioning boss 98, whereby the boss 98 may be received interiorly of the end portion 100 of the spring 94, as seen in FIG. 1. Moreover, as will hereinafter be described, the diameter of the spring end portion 102 is slightly smaller than the diameter of the positioning boss 98 so that the spring may assume the position shown in FIG. 2 in a slightly modified embodiment of the present invention.

The primary function of the spring 94 is to exert a yieldable axially directed force against the retainer member 84 and filter element 50, whereby to accommodate for dimensional variations (tolerances) in the components of the unit 10 and thereby assure against movement of these components within the enclosure 12 once the entire filter unit has been assembled. The spring 94 serves the additional function of maintaining a preload on the filter seals. This yieldable force is accomplished by maintaining the spring 94 under a state of compression so that the spring 94 yieldably biases the retainer member 84 and additive body 82 therein upwardly in FIG. 1, and yieldably biases the filter element 50 downwardly in FIG. 1 toward a position where the element 50 remains immovable with respect to the base plate 36. Thus, the spring 94 serves the basic function of the spring 92 in the aforementioned copending patent application.

A particularly important feature of the present invention resides in the fact that the compressive force of the spring 94 is exerted via the retainer member portions 88 and 86 directly to the end section 16 of the enclosure 12 without such force having to, in any way, be exerted against or through the additive body 82 per se. Another feature of the present invention resides in the fact that the additive body 82 may be provided in a solid disc shape, as opposed to ring shape, as was the case in the aforementioned copending patent application, thus permitting the additive body 82 to be manufactured in a more economical manner than was heretofore possible when the body assumed a ring-shaped configuration. By virtue of the fact that the aforementioned spring force is directed via the retainer member 84 to the enclosure 12, the additive body 82 may, for all practical purposes, be of any desirable configuration consistent with the desired rate of dissolution thereof over the service life of the oil being circulated through the unit 10. Hence the present invention lends itself to universality of application. Moreover, by so designing the spring and retainer member 84, the rate of dissolution of the body 82 may be selectively changed by varying the size and/or number of apertures 90 by which oil flowing through the unit 10 comes into contact with the additive body 82, all of which can be done without modifying the spring 94.

Another particularly important feature of the present invention resides in the fact that by locating the spring 94 between the retainer member 84 and filter element 50, a given size additive body 82 and retainer member 84 may be utilized in filter units of different sizes. For example, it is complicated that the arrangement shown in FIG. 1 could be utilized in a relatively small size unit, for example, one in which the OD of the enclosure 12 is approximately 3.02 inches, and the same additive body 82' and retainer member 84' shown in FIG. 2 could be used with an enclosure 12' which is approximately 3.67 inches OD. In the latter arrangement, the spring 94' may be reversed or inverted from the position shown in FIG. 1 wherein the minor diameter end portion 102' bears against the underside of the retainer member 84' and the major diameter end portion 100' is received within the depression 96' of the end cap 54'. By virtue of the size relationship of the positioning boss 98, 98' with respect to the diameter of the end portions 100, 102, the boss 98, 98' is operable to positively position the spring 94, 94' in either upright or inverted installations of the spring 94, 94'. FIG. 3 illustrates another embodiment of the present invention wherein the retainer member 84" and body 88" are disposed in an inverted position with respect to their positions in FIGS 1 and 2. In this latter arrangement, the retainer member 84" includes a downwardly projecting peripheral lip portion 110 surmounted upon the upper end cap 54" of the associated filter element 50". The spring 94" is interposed between the retainer portion 88" and the interior surface of the housing end section 16", whereby to exert a compressive force against the filter components via the retainer member 84" and without transmitting such force through the body 88", as hereinabove described.

It will thus been seen that the present invention provides a novel arrangement by which the components within a filter enclosure may be positively retained in place without sacrificing universality of application, and in a manner so as to minimize the number of structural components or "hardware" embodied within the filter unit. Accordingly, the present invention not only provides for improved performance, application, etc., but also will enable a manufacturer to produce the filter unit at a savings in cost.

While it will be apparent that the preferred embodiments illustrated herein are well calculated to fulfill the objects above stated, it will be appreciated that the present invention is susceptible to modification, variation and change without departing from the scope of the invention.

I claim:

1. In a filter unit for use with a circulating oil system, sais unit including an enclosure having a side wall section, a closed end section and an open end section, a filter element disposed within said enclosure, a closure member closing said open end section of said housing and defining inlet and outlet flow paths along which fluid may pass between said filter element and the associated fluid system, combination thereof with:

an additive body within said enlosure located between said closed end section thereof and the adjacent end of said filter element, said body being of a disc shaped configuration and disposed within a cup-shaped retainer member, said body being dissolvable at a controlled rate so as to replace oil additives comsumed during operation of the oil in the associated system, and conically-shaped helical coil spring means for transmitting a compressive force against said element from said retainer member and thereby retaining said element and additive body in their respective operative positions within said enclosure independent of dimensional tolerances and without transmitting said force directly through said body so as to be operable independently of the amount of said body that has been dissolved as a result of additives being replaced in the oil.

2. The invention as set forth in claim 1 which includes an end cap member on the end of said filter element which is engageable with said spring means.

3. The invention as set forth in claim 2 which includes positioning means on said retainer member and said end cap member for positioning said spring within said enclosure.

4. The invention as set forth in claim 3 wherein said spring is adapted to be installed between said retainer member and said end cap members in an upright and an inverted position.

* * * * *